(12) United States Patent
Heer

(10) Patent No.: US 11,440,520 B2
(45) Date of Patent: Sep. 13, 2022

(54) BRAKING SYSTEM FOR A COMMERCIAL VEHICLE, COMPRESSED AIR PROCESSING UNIT AND USE OF A COMPRESSED AIR PROCESSING UNIT

(71) Applicant: Haldex Brake Products Aktiebolag, Landskrona (SE)

(72) Inventor: Siegfried Heer, Wiesloch (DE)

(73) Assignee: Haldex Brake Products Aktiebolag, Landskrona (SE)

( * ) Notice: Subject to any disclaimer, the term of this patent is extended or adjusted under 35 U.S.C. 154(b) by 70 days.

(21) Appl. No.: 16/986,626

(22) Filed: Aug. 6, 2020

(65) Prior Publication Data

US 2020/0361436 A1 Nov. 19, 2020

Related U.S. Application Data

(63) Continuation of application No. PCT/EP2019/051701, filed on Jan. 24, 2019.

(30) Foreign Application Priority Data

Feb. 7, 2018 (DE) ..................... 10 2018 102 764.8

(51) Int. Cl.
  *B60T 13/68* (2006.01)
  *B60T 13/26* (2006.01)
  (Continued)

(52) U.S. Cl.
  CPC .......... *B60T 13/683* (2013.01); *B60T 13/268* (2013.01); *B60T 15/027* (2013.01); *B60T 17/002* (2013.01); *B60T 2270/402* (2013.01)

(58) Field of Classification Search
  CPC ........ B60T 13/68; B60T 13/683; B60T 13/26; B60T 13/268; B60T 15/027;
  (Continued)

(56) References Cited

U.S. PATENT DOCUMENTS 7,866,761 B2 * 1/2011 Gerum .................... B60T 8/321
    303/9.61
8,220,876 B2 * 7/2012 Detlefs .................. B60T 17/02
    303/3

(Continued)

FOREIGN PATENT DOCUMENTS

DE      102013000275 A1 *  7/2014 ............ B60T 13/683
DE   10 2014 013 756 B3    2/2016
(Continued)

OTHER PUBLICATIONS

Written Pinion of the International Searching Authority for PCT/EP2019/051701.

*Primary Examiner* — Thomas J Williams
(74) *Attorney, Agent, or Firm* — The Sladkus Law Group

(57) ABSTRACT

The invention relates to an electropneumatic brake system (1) for a commercial vehicle. The brake system (1) comprises brake control modules (8) by which it is possible to generate a brake pressure for service brake cylinders (6) which can be associated with single vehicle wheels or vehicle wheels of a vehicle axle. According to the invention there is a redundant compressed air supply of the brake control modules (8) by connecting the brake control modules (8) both to a compressed air reservoir (41, 42) as well as to a backup compressed air reservoir (43).

9 Claims, 10 Drawing Sheets

(51) Int. Cl.
*B60T 15/02* (2006.01)
*B60T 17/00* (2006.01)

(58) Field of Classification Search
CPC .. B60T 17/002; B60T 17/226; B60T 2270/40; B60T 2270/402
See application file for complete search history.

(56) References Cited

U.S. PATENT DOCUMENTS

| | | | |
|---|---|---|---|
| 9,783,019 B2 * | 10/2017 | Diekmeyer | ........... F15B 11/162 |
| 2007/0170774 A1 | 7/2007 | Gerum et al. | |
| 2009/0057072 A1 | 3/2009 | Wood et al. | |
| 2009/0280959 A1 | 11/2009 | Bensch et al. | |
| 2010/0252378 A1 * | 10/2010 | Hilberer | ................ B60T 13/683 188/106 F |
| 2012/0073669 A1 | 3/2012 | Diekmeyer | |
| 2012/0080935 A1 | 4/2012 | Steinberger et al. | |
| 2016/0152222 A1 * | 6/2016 | Lenz | ....................... B60T 13/26 303/127 |
| 2017/0267221 A1 | 9/2017 | Hecker | |

FOREIGN PATENT DOCUMENTS

| | | | | |
|---|---|---|---|---|
| DE | 102014013756 B3 * | 2/2016 | ............. | B60T 8/885 |
| EP | 1 069 016 A2 | 1/2001 | | |
| EP | 1 122 142 A1 | 8/2001 | | |
| EP | 1544072 A1 * | 6/2005 | ............. | B60T 8/343 |
| WO | 01/08953 A1 | 2/2001 | | |
| WO | 2004/098967 A1 | 11/2004 | | |
| WO | 2007/037818 A2 | 4/2007 | | |
| WO | 2008/025404 A1 | 3/2008 | | |
| WO | 2010/094481 A2 | 8/2010 | | |
| WO | 2017/060128 A1 | 4/2017 | | |

* cited by examiner

BRAKING SYSTEM FOR A COMMERCIAL VEHICLE, COMPRESSED AIR PROCESSING UNIT AND USE OF A COMPRESSED AIR PROCESSING UNIT

CROSS REFERENCE TO RELATED APPLICATIONS

This application is a continuation of International Application PCT/EP2019/051701 with an international filing date of Jan. 24, 2019 and claiming priority to German Patent Application No. DE 10 2018 102 764.8 entitled "Bremsanlage für ein Nutzfahrzeug, Druckluftaufbereitungseinheit and Verwendung einer Druckluftaufbereitungseinheit", filed on Feb. 7, 2018.

FIELD OF THE INVENTION

The invention relates to a brake system for a commercial vehicle. In the brake system two brake pressures for two service brake cylinders or two groups of service brake cylinders (which are in particular associated with different vehicle axles or circuits of service brake cylinders) are electronically controlled or influenced by two brake control modules. Here, the two brake control modules are each associated with a respective service brake cylinder or a respective group of service brake cylinders. However, also more than two control modules with associated additional service brake cylinders or groups of service brake cylinders can be present. Furthermore, the invention relates to a compressed air processing unit for a commercial vehicle. Finally, the invention relates to a new use of a compressed air processing unit.

BACKGROUND OF THE INVENTION

WO 2017/060128 A1 discloses a brake system wherein a brake pressure for service brake cylinders of a rear axle is generated by a 1-channel-pressure control module (with an optional interposition of electronically controlled ABS pressure control valves). A supply port of the 1-channel-pressure control module is supplied with compressed air from a supply reservoir which additionally serves for the supply of compressed air to a foot brake module. The 1-channel-pressure control module comprises a pneumatic control port. The pneumatic brake pressure controlled by the foot brake module due to the actuation of the brake pedal by the driver is transmitted to the pneumatic control port. The 1-channel-pressure control module comprises a relay valve with an inlet-/outlet valve being actuated by a relay piston. The inlet-/outlet valve generates the brake pressure being transmitted to the service brake cylinders dependent on the control pressure biasing the relay piston. For provided electric power supply and working control unit of the 1-channel-pressure control module the control pressure of the relay valve is defined by two solenoid valves being controlled by the control unit. The solenoid valves are embodied as closing valves which take the closed position without energization. The solenoid valve connects the control port to the supply port for increasing the control pressure at the control port of the relay valve whereas the other solenoid valve connects the control port of the relay valve to a vent for decreasing the controlled pressure at the control port of the relay valve. For the control of the solenoid valves, of the control pressure of the relay valve and so of the controlled brake pressure for the service brake cylinders by the control unit, an electric control signal of the foot brake module corresponding to the actuation of the brake pedal is transmitted to the control unit via an electric control port of the 1-channel-pressure control module. In the case of a failure of the electric power supply or of a reduced function of the control unit the solenoid valves take their closed positions so that the control port of the relay valve is closed against the supply reservoir as well as against the vent. However, in this case a backup solenoid valve also embodied as closing valve takes an open position. Accordingly, the pneumatic control port of the 1-channel-pressure control module being connected to the foot brake module is connected to the control port of the relay valve. In this backup operating state the control of the relay valve and so the definition of the pressure for the service brake cylinders is provided via the actuation of the brake pedal of the foot brake module by the driver and by the pneumatic control pressure generated in this way by the foot brake module. The brake system known from WO 2017/060128 A1 also comprises a 1-channel-pressure control module for generating a brake pressure for service brake cylinders of a front axle. The 1-channel-pressure control module for the front axle generally has a design corresponding to the 1-channel-pressure control module for the rear axle as explained above. However, a supply port of the 1-channel-pressure control module of the front axle is supplied with compressed air in a parallel fashion via a first line branch which comprises a check valve and a supply reservoir and via a second line branch which comprises a check valve and another supply reservoir and which is also responsible for the supply of compressed air to an auxiliary consumer circuit (here an air suspension circuit). The two 1-channel-pressure control modules for the front axle and the rear axle together form a constructional unit, namely a 2-channel-pressure control module. By the two separate control units of the two 1-channel-pressure control modules and by means of the control of the solenoid valves (and so by means of the control of the control pressure for the relay valves) a control of different brake pressures for the service brake cylinders on the one hand of the front axle and on the other hand of the rear axle is possible corresponding to the desired axle load distribution. In order to allow a closed loop control the brake pressure controlled by the relay valves can be sensed by pressure sensors integrated into the 1-channel-pressure control modules and can be processed by the control units.

WO 01/08953 A1 discloses a brake system of a commercial vehicle wherein service brake cylinders of a rear axle of the commercial vehicle are controlled by an electronically controlled 2-channel-pressure control module. The 2-channel-pressure control module is supplied with compressed air from a supply reservoir. Here, the supply reservoir only supplies compressed air for the service brake cylinders of the rear axle. The service brake cylinders of a front axle of the commercial vehicle are each supplied with compresses air via associated 1-channel-pressure control modules. A 1-channel-pressure-control module associated with one vehicle side of the front axle comprises a supply port connected to a supply reservoir for the front axle. The 1-channel-pressure control module also comprises a control port to which the pneumatic brake pressure controlled by the driver via a brake pedal is transmitted. In the case of a failure of the electropneumatic control of a brake pressure the 1-channel-pressure control module transmits the pneumatic brake pressure of the control port to the service brake cylinders. The 1-channel-pressure control module of the other vehicle side of the front axle also comprises a supply port and a control port with associated connection of the outlet of the 1-channel-pressure control module to the associated service brake cylinder. However, in this 1-channel-pressure control module the supply port is connected via a shuttle valve on the one hand to the supply reservoir of the front axle and on the other hand to an auxiliary supply reservoir. Here, the port of the shuttle valve connected to the supply reservoir of the front axle is prioritized by the shuttle valve in a way such that without a drop of the pressure in the supply reservoir of the front axle due to a leakage of the supply port the 1-channel-pressure control module is connected to the supply reservoir of the front axle. Only in the case of a leakage the shuttle valve connects the 1-channel-pressure control module to the auxiliary supply reservoir. Furthermore, for this 1-channel-pressure control module the control port is connected via a relay valve to the auxiliary supply reservoir. Here, the relay valve comprises a first effective surface biased by the pneumatic brake pressure controlled by the driver via the brake pedal as well as another effective surface acting in opposite direction which is biased with a pneumatic brake pressure controlled by a trailer control valve.

WO 2010/094481 A2 (corresponding to US patent application US 2012/0080935 A1) discloses a 2-channel-pressure control module which biases the service brakes both of the front axle as well as of the rear axle of a commercial vehicle. The 2-channel-pressure control module comprises supply ports for the front axle and the rear axle. The supply ports are connected to an associated supply reservoir as well as to a control port to which the pneumatic brake pressure set by the driver via the brake pedal is transmitted.

Further prior art is known from WO 2008/025404 A1 (corresponding to US patent application US 2009/0280959 A1).

SUMMARY OF THE INVENTION

The present invention relates to an electropneumatic brake system wherein at least one electronic control unit controls a brake pressure for a service brake cylinder on the basis of at least one electric control signal by use of electrically actuated valves. Here, the brake pressure can be controlled by an open loop control or a closed loop control (in the following also together denoted as "control"). The generated absolute value and/or progression of the brake pressure might e. g. consider
- a brake demand set by the driver (in particular on the basis of an actuation of the brake pedal by the driver with the direct generation of an electric brake signal) and/or
- a brake signal automatically generated by a control unit on the basis of operational parameters, in particular on the basis of a system for avoiding a collision, a speed control and/or a system for avoiding slip as an ABS- or EBS-control,
- or might correlate with the brake demand and/or the brake signal or equal the same.

Within the invention brake control modules are used. The brake control modules are in particular embodied as electronic brake control modules with an electronic control unit, an inlet port (by which compressed air is provided for the brake control module) and at least one solenoid valve being controlled by the control unit. By the at least one solenoid valve the compressed air provided at the inlet port is converted into a brake pressure for a service brake cylinder on the basis of the control by the control unit. Here, it is possible that the control unit determines the control signals for generating a brake pressure from operating parameters provided to the brake control module and/or the control unit of the brake control unit is connected to another control unit (in particular a central brake control unit) via a wire-bound or wireless network, a bus system or a signal line or data line and receives a setting value or an influencing parameter for the brake pressure which is to be generated.

In the inventive electropneumatic brake system, a first brake control module is provided. A brake pressure is controlled by means of the first brake control module. This brake pressure might e. g. be designated exclusively for a service brake cylinder of a vehicle wheel or also for service brake cylinders of different vehicle wheels or for service brake cylinders of a vehicle axle or service brake cylinders of vehicle axles forming a group.

Furthermore, the inventive electropneumatic brake system comprises a second brake control module. By means of the second brake control module it is also possible to generate a brake pressure which is then designated for at least one service brake cylinder of (another) vehicle wheel or for service brake cylinders of at least one (other) vehicle axle. Here, the brake pressures controlled by the two brake control modules might temporarily or permanently equal each other or differ from each other (e g. dependent on a static or dynamic wheel or axle load distribution and/or dependent on any existing slip).

The inventive brake control modules might each be embodied as a constructional unit or might be combined with other constructional elements serving for other functions to a constructional unit. It is also possible that the two brake control modules are integrated in one constructional unit. Preferably, the brake control modules are arranged in the region of a vehicle wheel, a vehicle wheel suspension, a vehicle axle or a vehicle axle suspension and mounted to the vehicle chassis, the vehicle axle or an axle body, the vehicle wheel suspension or the vehicle axle suspension. The brake control modules communicate pneumatically or electrically e. g. via rigid or flexible cables or lines or wirelessly with other constructional elements directly or indirectly supported by the vehicle chassis whereas the pneumatic outlets of the brake control modules are preferably connected to the service brake cylinders via flexible lines or tubes.

In the inventive electropneumatic brake system a brake control module is supplied in a redundant way with compressed air by connecting this brake control module (in particular an inlet port of the same) both to a compressed air reservoir as well as to a backup compressed air reservoir. Within the frame of the invention a connection of the brake control module to the compressed air reservoir respectively the backup compressed air reservoir is not only understood to be a permanent pneumatic line connection but any connection which allows at least in specific operational situations the transfer of compressed air from the compressed air reservoir respectively from the backup compressed air reservoir to the brake control module (in particular to the inlet port of the same). This covers embodiments wherein during a normal operation there is only a connection between the compressed air reservoir and the brake control module whereas the connection between the backup compressed air reservoir and the brake control module is closed. Then, only in a backup case (in particular in the case of a leakage of the compressed air reservoir or of a line arranged upstream from the compressed air reservoir or a leakage of a pneumatic component or line or pneumatic components or lines arranged here on the way of the compressed air from the compressed air reservoir to the brake control module) the connection between the backup compressed air reservoir and the brake control module is opened, whereas in this case the connection between the compressed air reservoir and the brake control module is closed. However, it is also possible that (at least temporarily and/or in specific operational situations) both the connection of the compressed air reservoir to the brake control module as well as the connection of the backup compressed air reservoir to the brake control module is opened or closed. Furthermore, it is possible that the compressed air of the compressed air reservoir respectively the backup compressed air reservoir is transmitted to the inlet port of the brake control module without being changed. However, the invention also covers embodiments wherein the pressure biasing the inlet port of the brake control module is changed e. g. by an electronic control of valves on the way from the compressed air reservoir (respectively from the backup compressed air reservoir) to the brake control module (e. g. in order to generate a brake pressure at the inlet port of the brake control module correlating with a brake demand or a brake signal, the brake pressure then (in particular with a modulation or an anti-slip-control) being changed by the brake control module). Finally, the invention also covers embodiments wherein in the line connection between the compressed air reservoir respectively the backup compressed air reservoir and the brake control module passive components (as pressure securing valves, overflow valves and the like) are arranged.

The present invention bases on the finding that for known electro-pneumatic brake systems of a commercial vehicle the skilled person followed the prejudice that for guaranteeing the operational safety of the brake system it is sufficient that for a leakage in the brake system it is provided that at least a part of the service brakes of the commercial vehicle can still be operated (for a limited number of braking actions) so that the driver is able to brake the vehicle despite of the leakage with the remaining number of the available service brakes. For the brake systems mentioned in the beginning this approach of the skilled person leads to the consequence that in the commercial vehicle a brake control module is supplied with compressed air in a redundant fashion both from a compressed air reservoir as well as from a backup compressed air reservoir so that in the case of a leakage of the compressed air transmitted from the compressed air reservoir the backup compressed air reservoir is still able to provide the compressed air supply and so the operating ability of the brake control module and the service brake cylinders associated with the brake control module. For the first time the invention proposes that by means of a backup compressed air reservoir not only one single brake control module is supplied in a redundant fashion but that this applies for at least two brake control modules.

Furthermore, the invention does not use separate backup compressed air reservoirs for the two brake control modules in order to provide the operating abilities of the two brake control modules also in the case of a leakage. Instead, one backup compressed air reservoir is used in a multifunctional way by connecting the backup compressed air reservoir both to the first brake control module as well as to the second brake control module. This leads to a significant reduction of the constructional effort because it is not required to use a plurality of backup compressed air reservoirs. Without this necessarily being the case, within the frame of the invention it is even possible that only one single backup compressed air reservoir is responsible for more than two brake control modules for a backup supply of compressed air.

To mention only some examples covered by the invention the first brake control module and the second brake control module (and in some cases also further brake control modules) might be each associated with a respective service brake cylinder of a vehicle wheel or a plurality of service brake cylinders of vehicle wheels or service brake cylinders of a vehicle axle or service brake cylinders of a plurality of vehicle axles. However, it is also possible that by means of the backup compressed air reservoir a first brake control module is supplied with compressed air, the first brake control module being associated with the service brake cylinders of a vehicle axle whereas by means of the backup compressed air reservoir also a supply of compressed air to a second brake control module and a third brake control module is provided, the second and third brake control modules each being associated with service brake cylinders of a vehicle wheel. In particular, in the last mentioned case the first brake control module is a brake control module associated with a middle vehicle axle or a rear vehicle axle whereas the second brake control module and the third brake control module are associated with a front axle of the commercial vehicle.

In particular, the inventive compressed air reservoir respectively backup compressed air reservoir is a vessel for storing compressed air provided by a compressor of the commercial vehicle. Preferably, the compressed air reservoir is a compressed air vessel having a predefined volume wherein compressed air in a predefined pressure region supplied by an air processing device via circuit protection valves is stored. However, it is also possible that in particular the backup compressed air reservoir is provided by a tube volume or a volume of a pneumatic component (as e. g. air suspension bellows). Furthermore, the invention also covers embodiments wherein in a backup situation compressed air from the backup compressed air reservoir which has previously been provided by the compressor is not exclusively used but in the backup situation compressed air is additionally supplied by the compressor to the backup compressed air reservoir.

For a further embodiment of the inventive brake system a securing valve is interposed between a compressed air reservoir and the associated brake control module. In the case of a pressure drop in the compressed air reservoir (also in a backup situation; a leakage in the compressed air reservoir itself or in the lines or pneumatic components connected to the compressed air reservoir can be responsible for the pressure drop) the securing valve blocks a flow of compressed air from the brake control module to the compressed air reservoir so that it is avoided that the brake control module is vented via the leakage. In the simplest case a check valve is arranged upstream from the inlet port of the brake control module or the connection of the brake control module and the compressed air reservoir is provided by a shuttle valve. However, additional to a check valve or a shuttle valve any other valve might be used as the securing valve (e. g. a switching valve which in the backup situation switches the supply of compressed air from the compressed air reservoir to the backup compressed air reservoir and/or provides the desired blocking of the failing service brake circuit). Within the frame of the invention the securing valve can be arranged upstream from the brake control module (so between the brake control module and the compressed air reservoir). However, within the frame of the invention it is also possible that the securing valve is integrated into the brake control module.

For the redundant compressed air supply of the brake control modules on the one hand by the compressed air reservoir and on the other hand by the backup compressed air reservoir it is required that an inlet line of the brake control module is connected both to the compressed air reservoir as well as to the backup compressed air reservoir. Accordingly, it is possible that the two supply lines from the compressed air reservoir and the backup compressed air reservoir are merged to a common inlet line at a location outside from the brake control module by suitable pneumatic connecting units as a switching valve or any other valve, the common inlet line then being connected to a single inlet port of the brake control module. However, for a particular proposal of the invention the brake control modules each comprise a first inlet port and a second inlet port. The first inlet port and the second inlet port then merge into a common inlet line of the associated brake control module at a location within the brake control module (by use of a suitable pneumatic merging unit as a switching valve or shuttle valve or junction, in some cases with check valves arranged upstream therefrom). The first inlet ports of the two brake control modules are then each connected to an associated compressed air reservoir. Instead, the second inlet ports of the two brake control modules are then connected to the backup compressed air reservoir.

It is e. g. possible that for one embodiment of the invention compressed air reservoirs (being responsible for the compressed air supply of the brake control modules during the normal operation) are connected to the first inlet ports of the two brake control modules whereas an additional backup compressed air reservoir is provided for the supply of compressed air to the two brake control modules in the backup situation. However, for avoiding an additional backup compressed air reservoir it is also possible that the compressed air reservoirs (being each responsible for the compressed air supply of the brake control modules in situations other than the backup situation) are each used as the backup compressed air reservoir for the other brake control module. Accordingly, for this embodiment the two compressed air reservoirs are each connected to a first inlet port of an associated brake control module as well as a second inlet port of the other brake control module.

For another embodiment of the invention the brake system comprises a compressed air processing unit. The compressed air processing unit comprises a pressure controller, an air dryer and at least one circuit protection valve. In particular, the compressed air processing unit is designed according to the regulatory requirements, the compressed air processing unit serves for the supply of compressed air for a plurality of consumer circuits via a plurality of circuit protection valves and the compressed air processing unit might be embodied according to the various embodiments of compressed air processing units of this type known from the prior art. By means of the compressed air processing unit at least one compressed air reservoir and the backup compressed air reservoir are supplied with compressed air.

Within the frame of the invention the brake pressure for at least one service brake cylinder is controlled as explained in the beginning. This is provided with a control of the supply pressure biasing the inlet line or by adapting a brake pressure biasing the inlet line corresponding to a brake demand or a brake signal. For one constructive embodiment, in at least one brake control module the inlet line is connected via a solenoid valve (in particular a 2/2-way valve) to an outlet port of the brake control module to which at least one service brake cylinder is connected. If the solenoid valve is transferred into an open position by the control unit of the brake control module, the pressure of the inlet line is transferred to the outlet port which leads to an increase of pressure at the outlet port. Furthermore, the brake control module comprises a solenoid valve controlled by the control unit. The solenoid valve in particular also is a 2/2-way valve or closing valve. By this additional solenoid valve the outlet port is connected to a vent or a venting port. When transferring this solenoid valve into an open position, a venting of the outlet port is provided which leads to a decrease of the brake pressure in the service brake cylinder. Accordingly, dependent on the operating state of the two solenoid valves it is possible to increase, decrease or hold the brake pressure at the outlet port which allows a control (also covering a closed-loop control) of the brake pressure in the service brake cylinder.

For an alternative embodiment the inlet line is connected at a location in the brake control module via a combination of a 3/2-way-solenoid valve and a 2/2-way-solenoid valve (in any order of the solenoid valves in a series connection) to an outlet port for at least one service brake cylinder. If the 2/2-way-solenoid valve is switched into a closed position, the outlet port is blocked. If instead the 2/2-way-solenoid valve is transferred into its open position, the 3/2-way-solenoid valve in its open position connects the inlet line to the outlet port so that a pressurization of the service brake cylinders is possible and the 3/2-way-solenoid valve in a venting position provides an connection of the outlet port to a vent or a venting port.

For the two aforementioned alternatives the aforementioned solenoid valves serve for a direct pressurization and de-pressurization of the outlet port. For another alternative covered by the invention the aforementioned alternative combinations of two solenoid valves (parallel arrangement of 2/2-way-solenoild valves or series connection of a 3/2-way-solenoid valve and a 2/2-way-solenoid valve) bias a control port of a relay valve which is arranged in the brake control module and connects the inlet line to an outlet port for at least one service brake cylinder. In this case the solenoid valves serve for a pilot-control of the pressurization and de-pressurization by the relay valve with the use of the (per se known) amplification and control of the air flows by the relay valve.

For an inventive brake system the compressed air reservoir associated with the first brake control module is the backup compressed air reservoir for the second brake control module whereas the compressed air reservoir associated with the second brake control module is the backup compressed air reservoir for the first brake control module. Here, it is possible that the supply lines from the compressed air reservoirs each branch to the two brake control modules.

For another proposal of the invention an outlet of the compressed air processing unit (which is connected (via line connections with or without pneumatic components) to the second inlet ports of the brake control modules and which can so be used in the backup situation for the supply of compressed air) is connected to the outlets which are connected via compressed air reservoirs to the first inlet ports of the brake control modules. By this connection it is then possible to use the compressed air from the compressed air reservoirs for the supply of compressed air in the backup situation.

It is e. g. possible that an additional compressed air reservoir is provided as the backup compressed air reservoir, the backup compressed air reservoir exclusively serving for the supply of compressed air in the backup situation. However, it is also possible that the backup compressed air reservoir is used for other purposes (e. g. as a compressed air reservoir of an air suspension circuit, a trailer brake circuit, a spring brake circuit, an auxiliary consumer circuit or any other consumer circuit or even as a compressed air reservoir for another brake control module).

The invention also proposes a compressed air processing unit for a commercial vehicle. The compressed air processing unit comprises a pressure controller, an air dryer and outlets for consumer circuits (in particular at least two service brake circuits, an air suspension circuit, a trailer brake circuit, a spring brake circuit and/or an auxiliary consumer circuit). It is possible that at least one circuit protection valve is arranged upstream from the outlets. By the circuit protection valve e. g.
- a securing of a minimum pressure in a consumer circuit arranged downstream therefrom,
- a setting of a maximum pressure,
- a provision of the option of a transverse supply between single consumer circuits and/or
- a control of the order of filling can be provided. With respect to these aspects the compressed air processing unit might equal the compressed air processing units known from the prior art. According to the invention the compressed air processing unit comprises an additional outlet to which a backup circuit can be connected for supplying the aforementioned brake control modules in a redundant fashion with compressed air. Preferably, here the additional outlet is connected to inlet ports of two brake control modules. Instead, no common consumer circuit (namely no service brake circuit, no air suspension circuit, no trailer brake circuit, no spring brake circuit and no auxiliary brake circuit) is connected to the additional outlet. A compressed air processing unit equipped with an additional outlet of this type for a backup circuit can be used in an advantageous way in a brake system as explained above.

In another embodiment of the inventive compressed air processing unit the additional port for the backup circuit branches directly from a central line of the compressed air processing unit via a circuit line.

For an alternative embodiment the additional outlet for the backup circuit is connected via a circuit line (which is associated to the additional outlet) and via at least one line branch to a circuit line for another consumer circuit (in particular to a circuit line for a service brake circuit). Here, the line branch preferably branches at a location upstream from the circuit protection valve of the circuit line for the other consumer circuit from this circuit line. It is possible that a check valve securing the pressure is arranged in the line branch.

The invention also proposes a use of a compressed air processing unit as explained above and having an additional outlet for a backup circuit of a brake system as described above.

The invention proposes an electro-pneumatic brake system which (under consideration of the constructional effort) provides an increased operational safety and/or availability of the vehicle in the case of a pneumatic leakage. Furthermore, the present invention proposes a correspondingly improved compressed air processing unit and a new use of a compressed air processing unit.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if a service brake module or a solenoid valve is mentioned, this is to be understood such that there is exactly one service brake module or solenoid valve or there are two service brake modules or a solenoid valves or more service brake modules or a solenoid valves. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE FIGURES

In the following, the invention is further explained and described with respect to preferred exemplary embodiments illustrated in the drawings.

DETAILED DESCRIPTION

Figure 1:
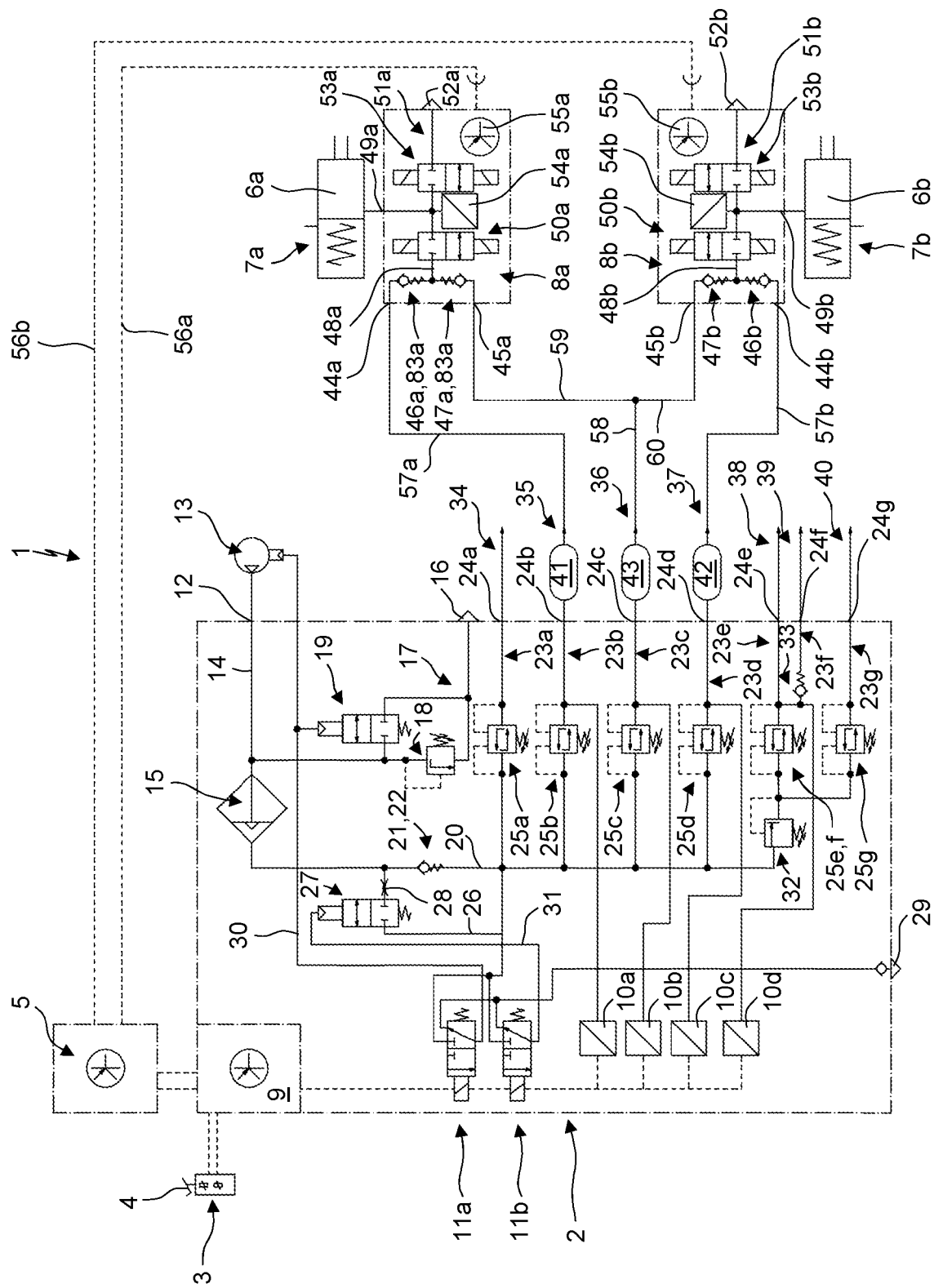
FIGS. 1 to 10 show different embodiments of a brake system comprising a compressed air processing device and brake control modules.

In the figures the same reference numerals are used for components in one embodiment or different embodiments if the components have the same or at least partially the same technical design and/or function. If for one embodiment components are denoted with the same reference numeral, these are differentiated from each other by the additional letter a, b, . . . Then, in this case in the specification the reference numeral is also used without additional letter, the description then being applicable for all of the components denoted with this reference numeral (and differentiated from each other in the figures by the additional letter). Single components of an embodiment can also be used for other embodiments of the brake system shown and described dependent on the needs and the effects strived for. In this case, the components can be used additionally or alternatively to the components of the other embodiment of the brake system shown.

A brake system 1 of FIG. 1 comprises a compressed air processing unit 2, a brake signal sensor 3 with a brake pedal 4 (where here the brake signal sensor 3 can be equipped with two channels for generating two electric brake signals and/or the brake signal sensor 3 only generates one electric brake signal), a central brake control unit 5, service brake cylinders 6 (which are here part of a combination brake cylinder 7) and brake control modules 8. According to FIG. 1 two service brake cylinders 6a, 6b respectively combination brake cylinders 7a, 7b are provided, a first brake control module 8a respectively a second brake control module 8b being each associated therewith.

The compressed air processing unit 2 comprises a control unit 9. Electric brake signals of the brake signal sensor 3 are transmitted via an inlet port of the compressed air processing unit 2 to the control unit 9. The control unit 9 transmits the brake signals (without changing the same or under modification of the same on the basis of further operational parameters) to the central brake control unit 5. The control unit 9 on the one hand receives measurement signals from the pressure sensors 10a, 10b, 10c, 10d. On the other hand, the control unit 9 serves for controlling solenoid valves 11 of the compressed air processing unit 2 for controlling the operation of the compressed air processing unit 2 (in particular for a pressure control and/or for switching between a loading phase and a regenerating phase).

The compressed air processing unit 2 is supplied with compressed air by a compressor 13 via an inlet port 12. The inlet port 12 is connected to an air dryer 15 via an inlet line 14. A venting branch 17 leading to a vent 16 of the compressed air processing unit 2 branches from the inlet line 14. A securing valve 18 and a pneumatically controllable closing valve 19 (which is in the closed position without an applied control pressure) are arranged in a parallel connection in the venting branch 17.

The compressed air supplied by the compressor 13 streams from the inlet line 14 through the air dryer 15 to a central line 20. The pressure in the central line 20 is secured by a securing valve 21, here a check valve 22. The central line 20 branches to circuit lines 23 which lead to outlets 24 which again lead to different consumer circuits. Circuit protection valves 25 are arranged in each of the circuit lines 23. In a generally known fashion, by means of the circuit protection valves 25 a securing of the pressures in the consumer circuits, a control of the order of filling of the consumer circuits and/or a provision of a transverse supply of one consumer circuit by another consumer circuit is provided.

For the embodiment shown in FIG. 1 the circuit protection valves 25 are passive valves. The operating position of these passive valves exclusively depends on the pressures in the circuit lines 23 on the inlet side and/or the outlet side of the circuit protection valve 25. Differing from the shown embodiments it is also possible that electro-pneumatically pilot-controlled circuit protection valves 25 are used in the circuit lines 23 and/or that the circuit protection valves 25 are directly electronically controlled by the control unit 9 (as being known from a variety of publications of the prior art for compressed air processing units 2).

For the shown embodiment the circuit protection valves 25 are embodied as overflow valves with a limited backflow. The pressure sensors 10a, 10b, 10c, 10d are connected to the circuit lines 23b, 23c, 23d and 23e via lines branches.

As a specific feature a common pressure limiting valve 32 is arranged upstream from the circuit lines 23e, 23f, 23g. Furthermore, the circuit lines 23e, 23f use the same circuit protection valve 25e, f. In the circuit line 23f a check valve 33 is arranged downstream from the circuit protection valve 25e, f.

The securing valve 21 is bypassed by bypass line 26 wherein a regeneration valve 27 and a pneumatic throttle 28 are arranged in series connection. For the shown embodiment the regeneration valve 27 is embodied as a pneumatically controlled 2/2-way valve or closing valve which takes its closed position without an applied control pressure.

The solenoid valves 11a, 11b are embodied as 3/2-way valves. An inlet port of the solenoid valves 11a, 11b is supplied with compressed air via a line branch branching from the central line whereas a respective venting port of the solenoid valves 11a, 11b is connected to a vent 29 of the compressed air processing unit 2. The third port of the solenoid valve 11a is connected to a control line 30 which is connected to a control port of the closing valve 19 as well as a control port of the compressor 13 for activating and deactivating the compressor 13. Instead, the third port of the solenoid valve 11b is connected to a control line 31 which is connected to the control port of the regeneration valve 27.

The compressed air processing unit 2 is operated as follow: In the supply mode of the compressor 13 the solenoid valve 11a is in the venting position so that the closing valve 19 takes its closed position. Compressed air supplied by the compressor 13 is dried in the air dryer 15 and transmitted via the securing valve 21 to the central line 20. According to the filling order defined by the opening pressures of the circuit protection valves 25 the circuit protection valves 25 successively take their open positions so that a filling of the associated consumer circuit is possible. If with continued filling a maximum pressure in the inlet line 14 is exceeded, the pressure is limited by the securing valve 18.

During a so called loading phase of this type (by which a first filling when starting the commercial vehicle can be provided or also a refilling during the operation of the commercial vehicle after a decrease of the operating pressure in a consumer circuit can be provided) the solenoid valve 11b is in the venting position so that the regeneration valve 27 takes its closed position.

A change from the loading phase into a regeneration phase is provided by a switching of the solenoid valves 11a, 11b so that these both takes their pressurizing positions. The pressurization of the control line 30 causes the deactivation of the compressor 13 and at the same time transfers the closing valve 19 into its open position. The pressurization of the control line 31 causes that the regeneration valve 27 takes its open position. This again leads to the result that compressed air from the consumer circuits is able (for a pressure above the securing pressure of the circuit protection valve 25) to stream from the central line 20 via the bypass line 26 with the opened regeneration valve 27 backwards through the air dryer 15 and from the air dryer 15 through the closing valve 19 to the vent. Due to the effect of the throttle 28 this stream of regeneration air is slowed down. The stream of regeneration air extracts humidity from the desiccant in the air dryer 15 for regenerating the same, the humidity then being discharged via the vent 16.

One consumer circuit being an air suspension circuit 34 is connected to the outlet 24a. One consumer circuit being a first service brake circuit 35 is connected to the outlet 24b. One consumer circuit being a backup circuit 36 is connected to the outlet 24c. One consumer circuit being a second service brake circuit 37 is connected to the outlet 24d. One consumer circuit being a trailer brake circuit 38 is connected to the outlet 24e. One consumer circuit being a spring brake circuit 39 or parking brake circuit is connected to the outlet 24f. One consumer circuit being at least one auxiliary consumer circuit 40 is connected to the outlet 24g.

The service brake circuits 35, 37 each comprise a compressed air reservoir 41, 42 whereas the backup circuit 36 comprises a backup compressed air reservoir 43. For the embodiment shown in FIG. 1 the compressed air reservoirs 41, 42 as well as the backup compressed air reservoir 43 are embodied as separate supply vessels. The other consumer circuits can be embodied with or without compressed air reservoirs or supply vessels.

The brake control modules 8a, 8b each comprise a first inlet port 44 and a second inlet port 45. In the brake control module 8 the two inlet ports 44, 45 merge via check valves

46. 47 into an inlet line 48. The check valves 46, 47 open (when exceeding a predefined opening pressure) towards the inlet line 48 but block a flow in opposite direction.

The brake control modules 8 comprise an outlet port 49 which is connected to the service brake chamber of the associated service brake cylinder 6 or combination brake cylinder 7.

The inlet line 48 is connected via a solenoid valve 50 to the outlet port 49. Here, the solenoid valve 50 is embodied as closing valve or 2/2-way-solenoid valve and preferably embodied as a bi-stable valve which is able to electrically change its operating position upon a short control impulse and maintains an operating position once taken without an energization of the solenoid valve 50. Accordingly, in the open position of the solenoid valve 50 compressed air biasing an inlet port 44, 45 of the brake control module 8 is able to bias the outlet port 49 and so the service brake cylinder 6. The outlet port 49 is connected via a venting branch 51 to a vent 52. A solenoid valve 53 is arranged in the venting branch 51. For the shown embodiment also the solenoid valve 53 is embodied as closing valve or 2/2-way-solenoid valve and preferably a bi-stable solenoid valve as explained for the solenoid valve 50.

A pressure sensor 54 being integrated into the brake control module 8 senses the pressure at the outlet port 59 so that also a closed-loop control of the brake pressure is possible.

The brake control modules 8 each comprise an electronic control unit 55 integrated into the same. The control units 55 receive control signals from the central brake control unit 5 via control lines 56 and control the solenoid valves 50, 53 on the basis of these control signals and under consideration of the measurement signal of the pressure sensors 54.

The inlet port 44*a* of the brake control module 8*a* is connected to the compressed air reservoir 41 via a supply line 57*a* whereas the inlet port 44*b* of the brake control module 8*b* is connected via a supply line 57*b* to the compressed air reservoir 42. A supply line 58 connected to the backup compressed air reservoir 43 branches to supply line branches 59, 60. The supply line branch 59 is connected to the inlet port 45*a* of the brake control module 8*a* whereas the supply line branch 60 is connected to the inlet port 45*b* of the brake control module 8*b*.

The brake system 1 is operated as follows: If as a result of the (per se known) operation of the compressor 13 and the compressed air processing unit 2 the consumer circuits have been filled, the driver is able to generate an electric brake signal by the actuation of the brake pedal 4. In the case of a demand for an increase of the braking effect the control unit 55*a* controls the solenoid valves 50*a* into the open position. This leads to the result that compressed air is able to stream from the compressed air reservoir 41 via the inlet port 44*a* to the service brake cylinder 6*a* and/or compressed air is able to stream from the backup compressed air reservoir 43 via the inlet port 45*a* to the service brake cylinder 6*a*. Correspondingly the control unit 55*b* controls the solenoid valve 50*b* of the brake control module 8*b* into the open position so that compressed air is able to stream from the compressed air reservoir 42 via the inlet port 44*b* to the service brake cylinder 6*b* and/or compressed air is able to stream from the backup compressed air reservoir 43 via the inlet port 45*b* to the service brake cylinder 6*b*. If instead (indicated by the release of the brake pedal 4) a reduction of the brake pressure is required the control unit 45 of the brake control module 8 controls the solenoid valves 53 into the open position whereas the solenoid valves 50 are controlled into the closed position. Accordingly, a venting of the service brake cylinder 6 is induced.

For a backup pressurization of the service brake cylinder 6*a*, 6*b* the backup compressed air reservoir 43 is connected to the two brake control modules 8*a*, 8*b*. It is possible that there is a permanent cumulative supply of compressed air for the brake control module 8*a* respectively 8*b* both from the compressed air reservoir 41 as well as from the backup compressed air reservoir 43 respectively the compressed air reservoir 42 and the backup compressed air reservoir 43.

If there is a leakage in one service brake circuit 35, 37, the system pressure reduces to the securing pressure of the circuit protection valves 25*b*, 25*d* being associated with the failing service brake circuit 35, 37. In this case it is possible that a warning indication is given to the driver, in particular by a warning lamp. However, the driver is able to continue the driving mode because due to the backup supply of compressed air sufficient supply pressure is provided for all of the brake control modules.

For a different design or choice of the circuit protection valves 25, the opening pressures of the circuit protection valves and/or the closing pressures of the circuit protection valves 25 and/or different opening pressures of the check valves 46, 47 or use of other valve elements than the check valves 46, 47 it is also possible that during a normal driving mode the supply of compressed air via the compressed air reservoirs 41, 42 is prioritized so that a supply of compressed air to the brake control modules 8*a*, 8*b* from the backup compressed air reservoir 43 is only given in the backup situation.

A backup situation is in particular given if there is a leakage in one of the service brake circuits 35, 37, in particular of the compressed air reservoir 41, 42 or a supply line 57*a*, 57*b*. If the service brake circuit 35, 37 is vented in such a backup situation, at least for a limited time interval a supply of compressed air is provided by the backup compressed air reservoir. A redundant compressed air supply is provided on the one hand by the compressed air reservoir 41, 42 and on the other hand by the backup compressed air reservoir 43.

For the embodiment shown in FIG. 1 it is e. g. possible that each brake control module 8*a*, 8*b* exclusively serves for pressurizing an associated service brake cylinder 6*a*, 6*b* which is again associated with a single vehicle wheel. The skilled person will understand that it is also possible that a plurality of service brake cylinders 6 is connected to an outlet port 49 of a brake control module 8, the plurality of service brake cylinders 6 then e. g. being associated with a vehicle axle, a vehicle side or a circuit of a service brake circuit having two or more circuits.

In FIG. 1 only the compressed air supplies of the brake control modules 8 are redundant. Additionally, also the control lines 56*a*, 56*b* can be redundant. In this case, also redundant brake control units 5*a*, 5*b* can be used. Here, it is also possible that the control unit 9 of the compressed air processing unit 2 (or any other, then multifunctional control unit) is used as the backup control unit for the brake control unit 5.

For the embodiments shown in the following generally the above correspondingly applies unless described in a different way.

Figure 2:
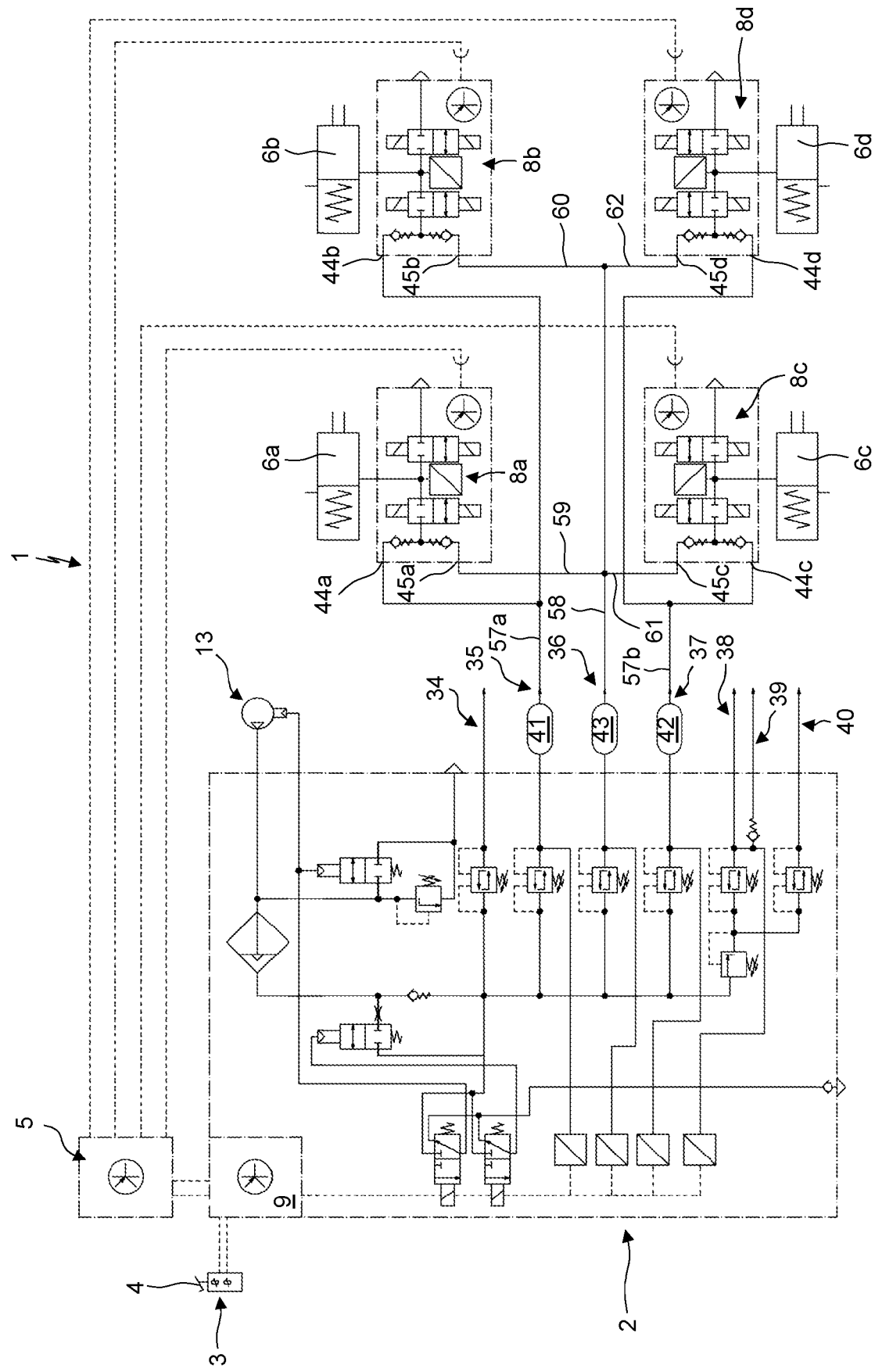

FIG. 2 shows an embodiment wherein four brake control modules 8*a*, 8*b*, 8*c*, 8*d* are provided which are each associated with a respective service brake cylinder 6*a*, 6*b*, 6*c*, 6*d* each being associated with a vehicle wheel of the commercial vehicle. Here, the brake control modules 8*a*, 8*b* with associated service brake cylinders 6*a*, 6*b* are associated with a front axle of the commercial vehicle whereas the brake control modules 8c, 8d with associated service brake cylinders 6c, 6d are associated with a rear axle of the commercial vehicle. In this case the brake control modules 8a, 8b are part of the first service brake circuit 35 whereas the brake control modules 8c, 8d are part of the second service brake circuit 37. For this purpose the supply lines 57a, 57b each branch into two supply line branches which are then each connected to an associated inlet port 44a, 44b respectively 44c, 44d. Instead, the supply line 58 extending from the backup compressed air reservoir 43 branches into the supply line branches 59, 60, 61, 62 which are connected to the inlet ports 45a, 45b, 45c, 45d of the brake control modules 8a, 8b, 8c, 8d. Accordingly, in this case the backup compressed air reservoir 43 is able to serve for the backup supply of compressed air for the four brake control modules 8a, 8b, 8c, 8d.

Figure 3:
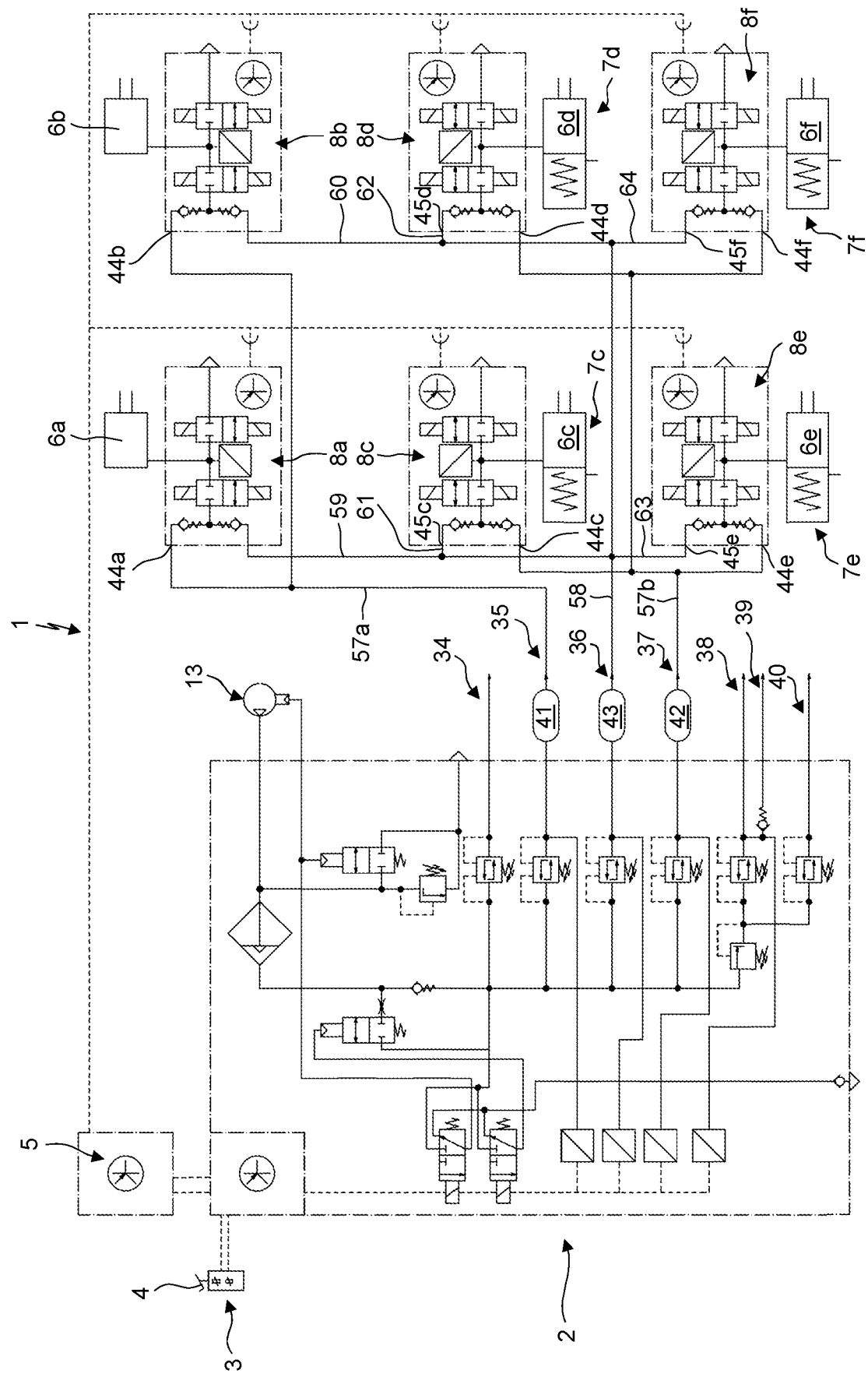

According to FIG. 3 six brake control modules 8a, 8b, 8c, 8d, 8e, 8f are used each being associated with respective service brake cylinders 6a, 6b, 6c, 6d, 6e, 6f which are again each associated with vehicle wheel of the commercial vehicle. Here, the brake control modules 8a, 8b are associated with service brake cylinders 6a, 6b of a front axle whereas the brake control modules 8c, 8d with associated service brake cylinders 6c, 6d are associated with a middle vehicle axle or a front vehicle axle of a rear double axle and the brake control modules 8e, 8f with associated service brake cylinders 6e, 6f are associated with a rear vehicle axle or a rear vehicle axle of a rear double axle. Here, the service brake cylinders 6a, 6b of the front axle do not have a spring brake part whereas the service brake cylinders 6c, 6d, 6e, 6f are part of combination brake cylinders 7c, 7d, 7e, 7f.

In this case the brake control modules 8a, 8b associated with the front axle are part of the service brake circuit 35 whereas the brake control modules 8c, 8d, 8e, 8f are part of the service brake circuit 37.

As explained for FIG. 2 the supply line 57a branches for allowing a connection to the inlet ports 44a, 44b of the brake control modules 8a, 8b. Due to the fact that four brake control modules 8c, 8d, 8e, 8f are connected to the second service brake circuit 37, the supply line 57b branches to four line branches being connected to the inlet ports 44c, 44d, 44e, 44f of the brake control modules 8c, 8d, 8e, 8f. The supply line 58 branches into six supply line branches 59, 60, 61, 62, 63, 64 each being connected to an associated inlet port 45a, 45b, 45c, 45d, 45e, 45f.

Figure 4:
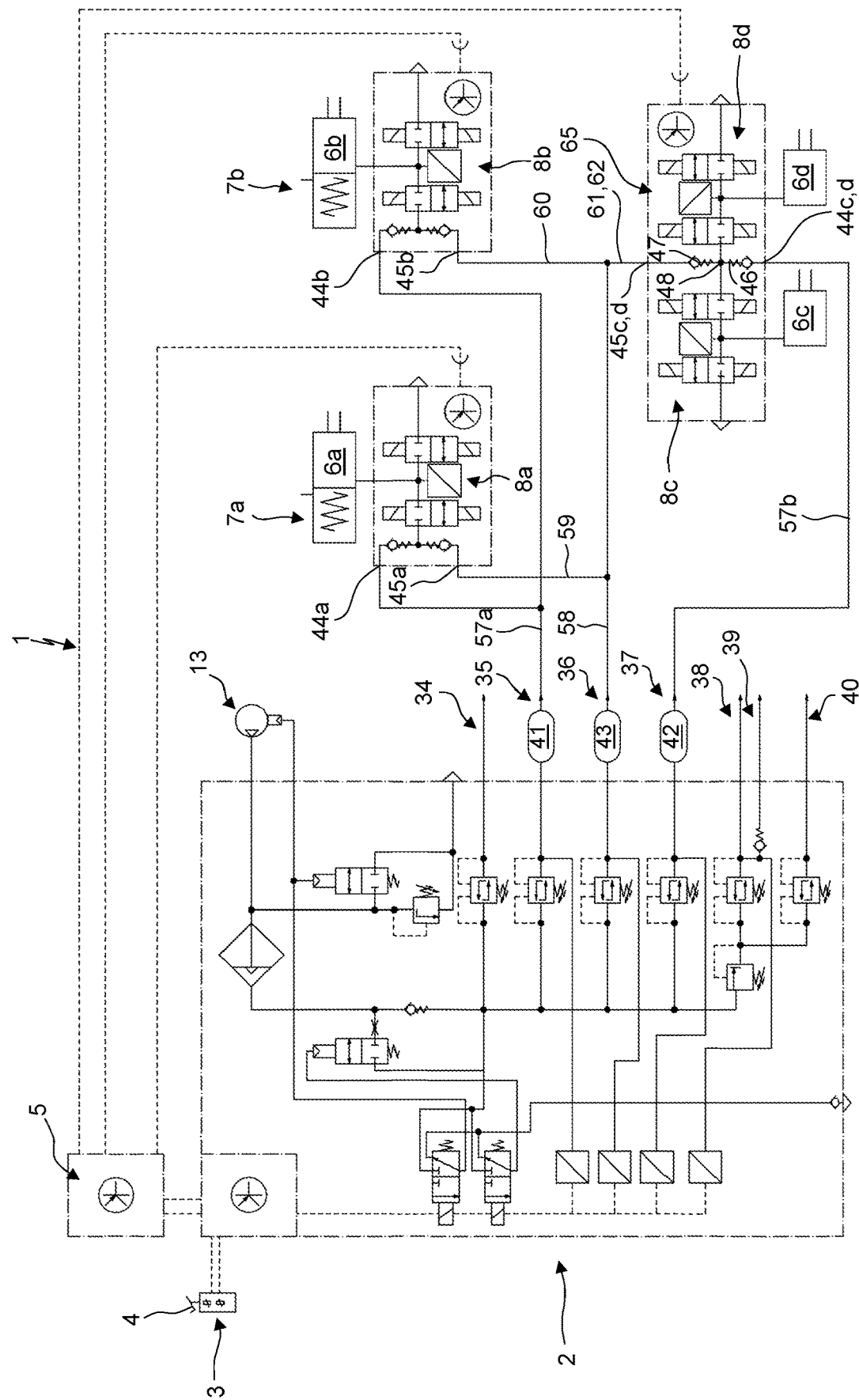

FIG. 4 shows an embodiment wherein the brake control modules 8a, 8b associated with a front axle are (corresponding to the description of FIGS. 2 and 3) part of the first service brake circuit 35 and are exclusively supplied from the compressed air reservoir 41. In this case the brake control modules 8c, 8d associated with a rear axle are integrated into a common brake control module unit 65 which (with respect to the function) generally corresponds to a 2-channel-pressure control module as described for the prior art in the beginning (however, without the use of a relay valve). In this case the brake control module unit 65 only comprises one inlet port 44c,d, which is connected via the supply line 57b to the compressed air reservoir 42, and one inlet port 45c,d which is connected via a single supply line branch 61, 62 to the supply line 58 and via the supply line 58 to the backup compressed air reservoir 43.

In the brake control module unit 65 at a location behind the check valves 46, 47 the inlet line 48 branches into two inlet line branches which then each serve for the supply of compressed air to the two brake control modules 8c, 8d.

Figure 5:
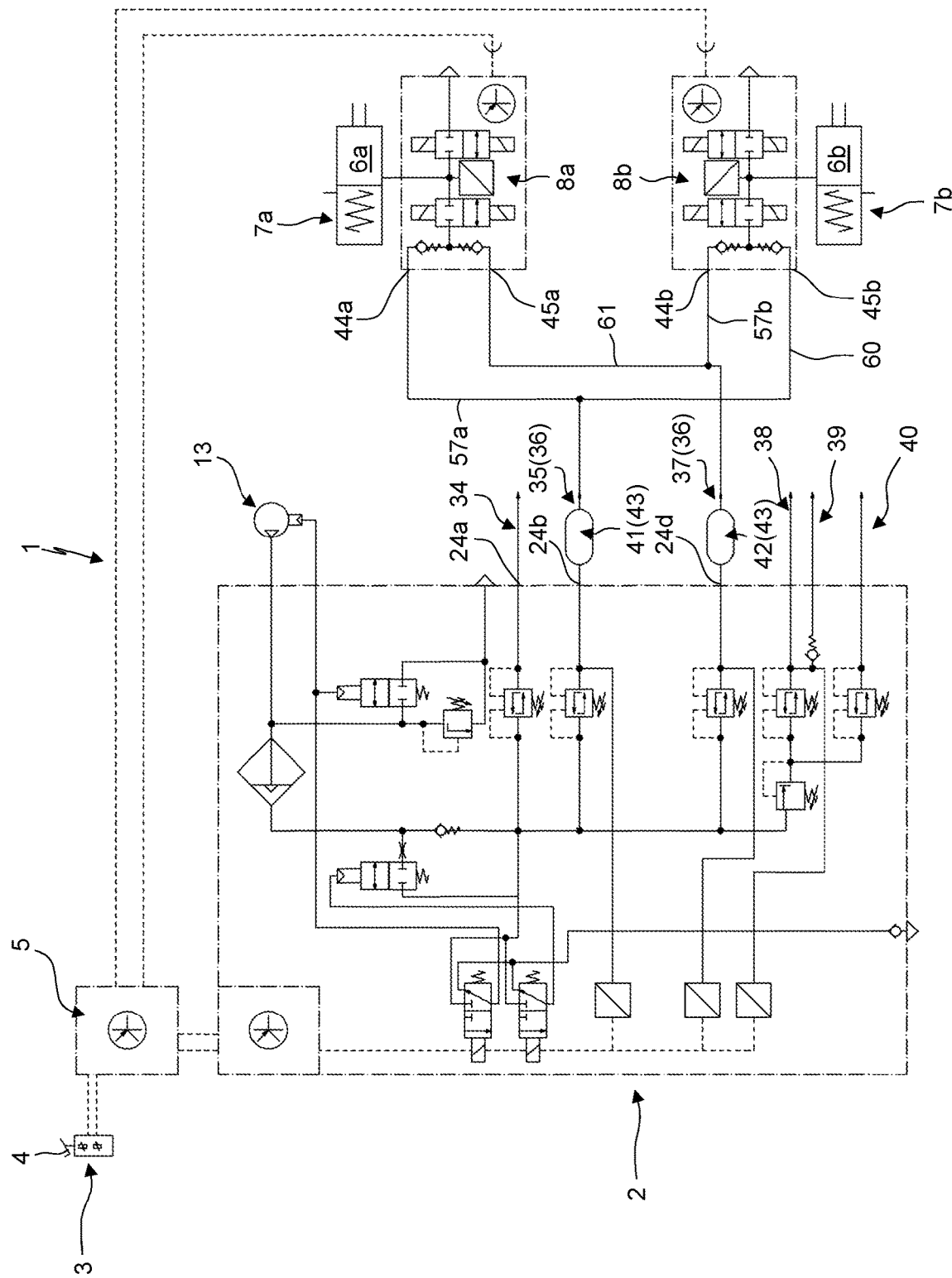

With respect to their design and the association with service brake cylinders 6a, 6b of combination brake cylinders 7a, 7b the brake control modules 8a, 8b of FIG. 5 correspond to the embodiment of FIG. 1. However, differing from FIG. 1 according to FIG. 5 the brake signal sensor 3 does not communicate with the control unit 9 of the compressed air processing unit 2 but with the brake control unit 5.

Differing from the compressed air processing unit 2 of FIG. 1 the compressed air processing unit 2 does not comprise the circuit line 23c and the outlet 24c so that in this case the brake system 1 does not comprise three compressed air reservoirs for the supply of compressed air to the brake control modules 8a, 8b. Instead, the brake control modules 8a, 8b are exclusively supplied with compressed air via two outlets 24b, 24d of the compressed air processing unit 2. One compressed air reservoir 41 is connected to the outlet 24b, the compressed air reservoir 41 being connected via the supply line 57a to the inlet port 44a of the brake control module 8a. However, for this embodiment a supply line branch 60 branches from the supply line 57a. The supply line branch 60 is connected to the inlet port 45b of the brake control module 8b. Accordingly, when using the nomenclature as above the aforementioned supply reservoir 41 provides the supply of the brake control module 8a in the normal operation as well as provides the backup supply of the brake control module 8b in the backup situation. Accordingly, one single supply reservoir forms both the compressed air reservoir 41 for the brake control module 8a as well as the backup compressed air reservoir 43 for the brake control module 8b. In a corresponding way the outlet 24d is connected to a compressed air reservoir 42 which is again connected via the supply line 57b to the inlet port 44b of the brake control module 8b. In this case a supply line branch 61 branches from the supply line 57b. The supply line branch 61 is connected to the inlet port 45a of the brake control module 8a for the backup supply of compressed air. In this way the supply reservoir connected to the outlet 24d integrally forms both the compressed air reservoir 42 (related with the brake control module 8b) as well as the backup compressed air reservoir 43 (related with the brake control module 8a). Despite of the use of only two compressed air reservoirs for both brake control modules 8a, 8b a redundant compressed air supply is provided.

Figure 6:
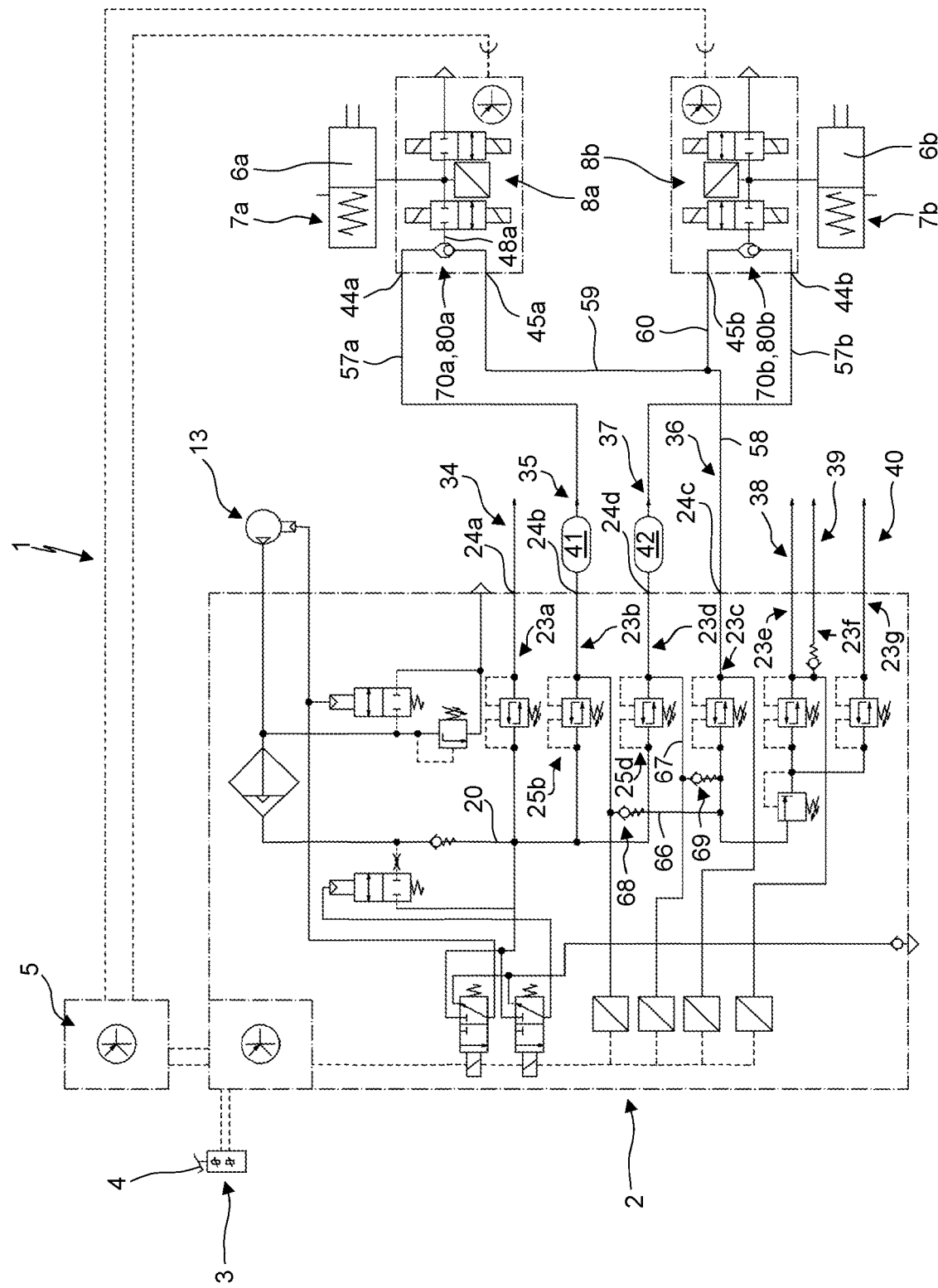

For the embodiment of FIG. 6 the compressed air processing unit 2 has a design differing from the compressed air processing unit 2 according to the above embodiments: Here, only the circuit lines 23a, 23b, 23d directly branch from the central line. At a location downstream from the circuit protection valves 25b, 25d the circuit lines 23c, 23f and 23g are connected via line branches 66, 67 (with check valves 68, 69 arranged therein which open towards the line branches 23c, 23f, 23g) to the circuit lines 23b, 23d so that these circuit lines 23c, 23f, 23g might be described as being arranged downstream in a series connection (with respect to the circuit protection valve 25b, 25d). In this case, in the first service brake circuit 35 the compressed air reservoir 41 is connected via the supply line 57a to the inlet port 44a of the brake control module 8a. Correspondingly, in the second service brake circuit 37 the compressed air reservoir 42 is connected via the supply line 57b to the inlet port 44b of the brake control module 8b. The backup circuit 46 does not comprise a backup compressed air reservoir 43. Instead, the outlet 24c of the compressed air processing unit 2 is directly connected via the supply line 58 and the supply line branches 59, 60 to the inlet port 45*a* of the brake control module 8*a* and the inlet port 45*b* of the brake control module 8*b*.

In FIG. 6 instead of the check valves 46, 47 a shuttle valve 70 is used in the brake control module 8. A first inlet of the shuttle valve 70 is connected to an inlet port 44, a second inlet of the shuttle valve 70 is connected to an inlet port 45 and the outlet of the shuttle valve 70 is connected to the inlet line 48. If there is a leakage in one service brake circuit (e. g. in the service brake circuit 35) there is a drop in the supply of pressurized air of the brake control module 8*a* via the supply line 57*a*. However, compressed air from the service brake circuit 37 and the compressed air reservoir 42 biases the inlet port 45*a* via the line branch 67, the check valve 69, the circuit line 23*c*, the outlet 24*c* and the supply line branch 59 so that the shuttle valve 70*a* provides the supply of pressurized air to the inlet line 48*a* of the brake control module 8*a*. Accordingly, the compressed air reservoir 42 provides the supply of compressed air to the brake control module 8*b* and this compressed air reservoir 42 at the same time serves as a backup compressed air reservoir 43 for the backup supply of the brake control module 8*a*.

The corresponding applies for a leakage in the second service brake circuit 37. In this case a backup supply of compressed air is provided from the compressed air reservoir 41 via the check valve 68, the line branch 66, the circuit line 23*c*, the outlet 24*c* and the supply line branch 60 to the brake control module 8*b*. Accordingly, in this case one supply reservoir forms the compressed air reservoir 41 for the supply of the brake control module 8*a* with compressed air and at the same time also forms the backup compressed air reservoir 43 for the backup supply of the brake control module 8*b*.

Figure 7:
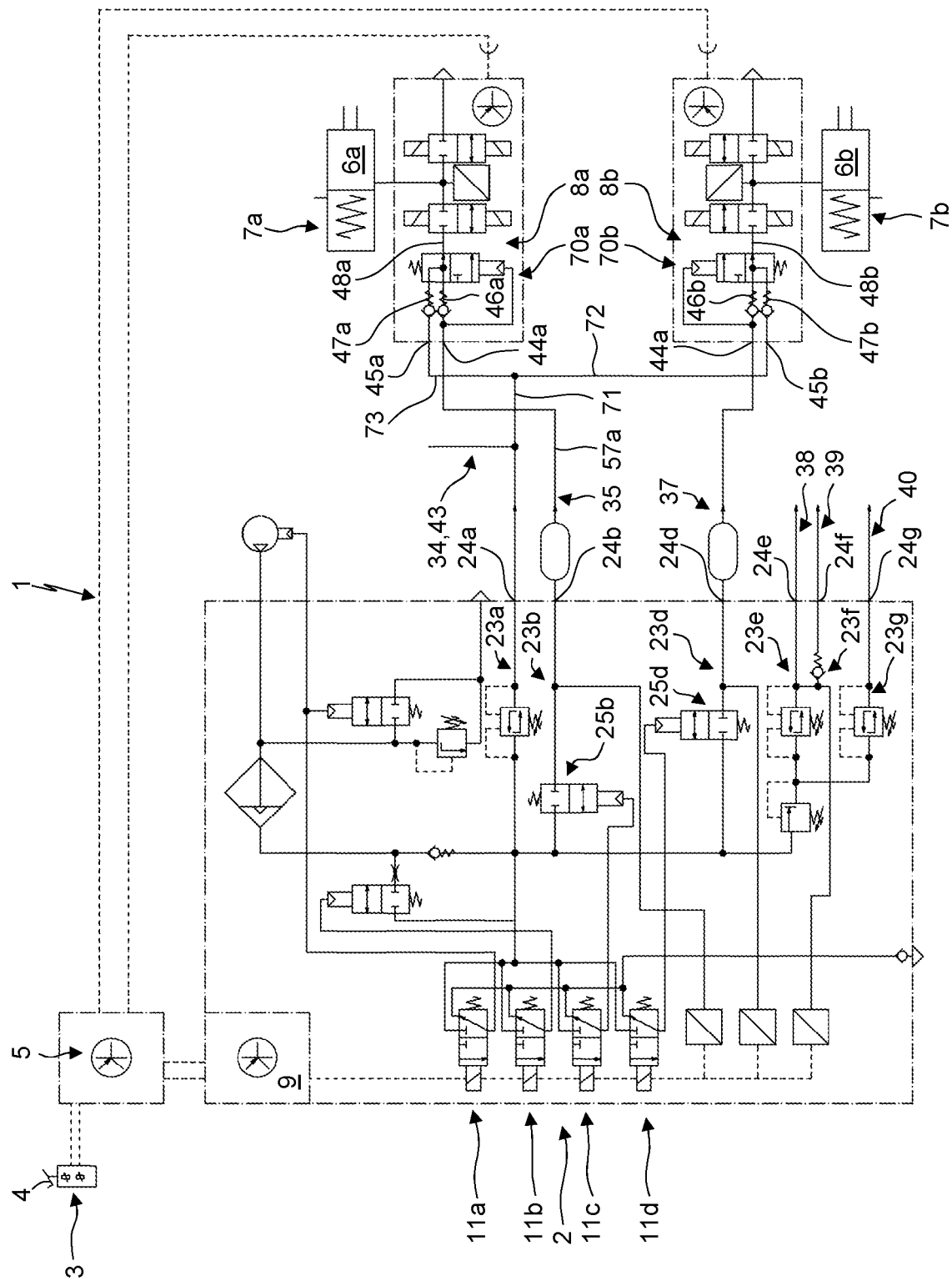

In FIG. 7 the brake control modules 8 have a design differing from the above embodiments.

Here, the inlets 44, 45 do not only merge via check valves 46, 47 into the inlet line 48. Instead, a valve (in particular a switching valve 70) is interposed between the outlets of the check valves 46, 47 and the inlet line 48. Dependent on the operating position of the switching valve 70 it is possible to connect the inlet line 48 via the associated check valve to the inlet port 44, the inlet port 45 and/or two inlet ports 44, 45. For the shown embodiment the switching valve 70 is a pneumatically controlled switching valve. Here, the switching valve is embodied as 3/2-way valve. In the switching position of the switching valve 70 being effective in FIG. 7 (which is induced by the bias of a spring without applied control pressure) the inlet line 48 is connected via the check valves 46, 47 to two inlet ports 44, 45. The pressure upstream from the check valve 46 at the inlet 44 is used as the control pressure for the switching valve 70. If there is a sufficient supply pressure at the inlet port 44, the switching valve 70 is switched into the other operating position wherein the connection of the inlet port 45 via the check valve 47 to the inlet line 48 is closed whereas the connection of the inlet port 44 via the check valve 46 to the inlet line 48 is opened. So, if there is a sufficient supply pressure in the service brake circuits 35, 37 the inlet ports 45 of the brake control modules 8 are closed so that the backup supply of compressed air is deactivated. Instead, for a pressure drop in the service brake circuits 35, 37 the switching valve 70 automatically takes the other operating position wherein the backup supply of compressed air via the inlet port 45 is activated. An exit of compressed air provided via the backup supply of compressed air via the defect in the service brake circuit is avoided due to the closure of this defect service brake circuit by the check valve 46. The person with skill in the art will understand that also for the embodiments in other figures instead of the brake control modules 8 used there a brake control module 8 of FIG. 7 can be used.

In FIG. 7 there is an optional modification of the compressed air processing unit 2 and of the connection of the same to the consumer circuits and the brake control modules 8: Here, the circuit protection valves 25*b*, 25*d* in the circuit lines 23*b*, 23*d* are no passive pressure control valves or pressure securing valves but actively controlled valves. For the shown embodiment 2/2-valves are used which preferably take their closed position without a control being applied. Here, the 2/2-valves are electro-pneumatically pilot-controlled by solenoid valves 11*c*, 11*d* being controlled by the control unit 9. This electronic control of the circuit protection valves 25*b*, 25*d* on the one hand allows an opening and a closure of the circuit protection valves 25*b*, 25*d* by the control unit 9 according to the needs. In the case that a leakage in one service brake circuit 35, 37 is determined it is possible to selectively control the associated circuit protection valve 25*b*, 25*d* into the closed position so that a further supply of compressed air into the failing service brake circuit 35, 37 and/or a reduction of the system pressure is avoided. A compressed air processing unit 2 modified in this way can also be used for the embodiments in the other figures.

Finally, in FIG. 7 the air suspension circuit 34 is used as the backup compressed air reservoir 43. In this case the compressed air for the backup supply of compressed air can be provided by the line volume of the air suspension circuit 34 and/or also by the volume of the air bellows. However, it is also possible that for this purpose any supply reservoir of the air suspension circuit 34 is used. For this purpose a supply line 71 branches from the air suspension circuit 34. The supply line 71 again branches into supply line branches 72, 73 each being connected to an inlet port 45*a*, 45*b*.

Figure 8:
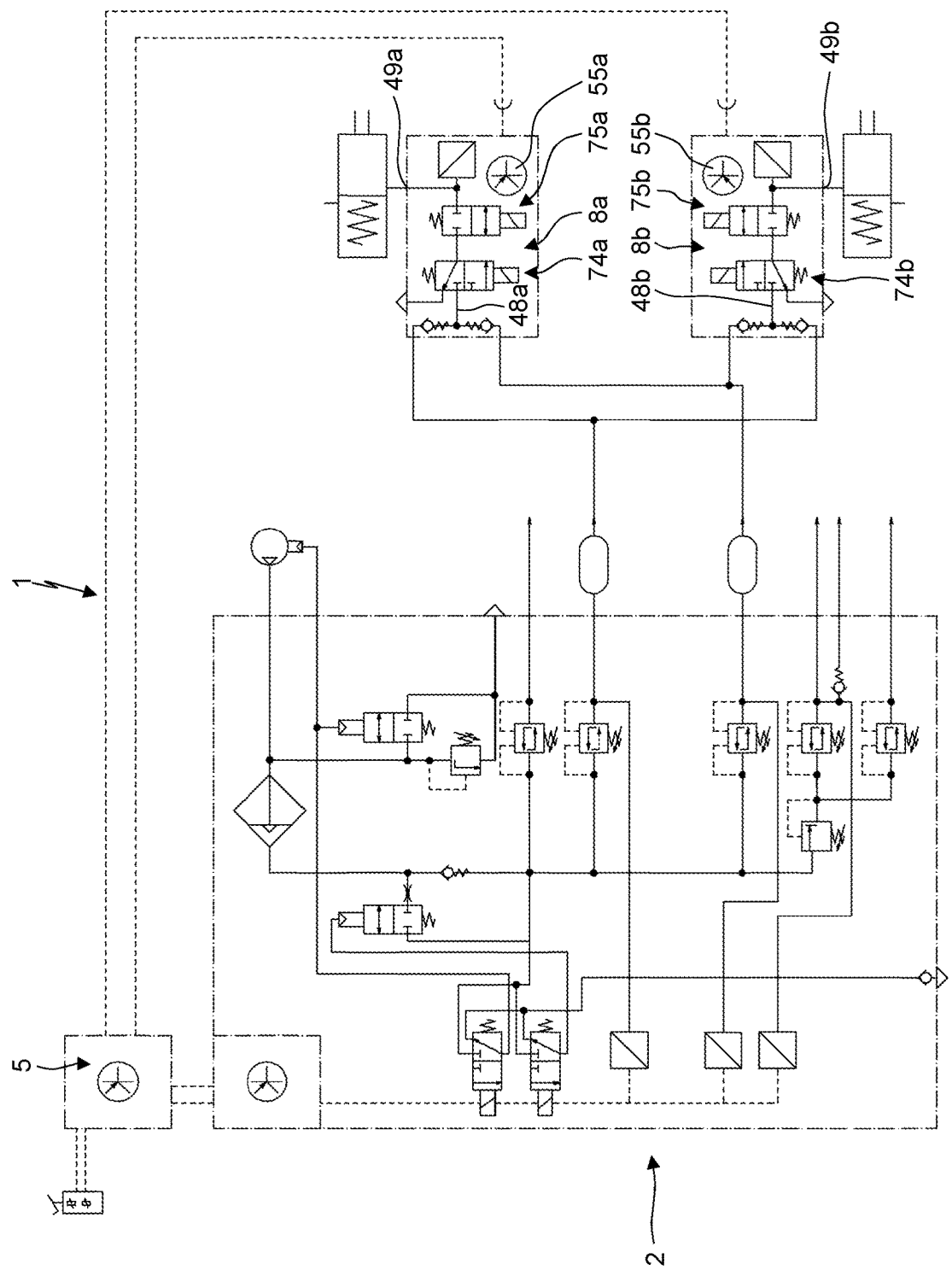

The embodiment of the brake system 1 show in FIG. 8 corresponds to the embodiment of FIG. 5 except the design of the brake control module 8. In the brake control modules 8 the inlet line 48 is connected via solenoid valves 74, 75 to the outlet port 49. The solenoid valve 74 is embodied as 3/2-way valve, in particular with a venting position taken when no control signal is applied and an open position taken when a control signal is applied. Instead, the solenoid valve 75 is a 2/2-way valve which preferably takes the closed position without a control signal being applied whereas the 2/2-way valve takes the open position with an applied control signal. The solenoid valves 74, 75 are controlled according to the needs by the control unit 55 which can again depend on or can be defined by the control signals of the brake control unit 5. For the shown embodiment the solenoid valves 74, 75 are in the mentioned order interposed between the inlet line 48 and the outlet port 49 in a series connection whereas also a reversed order is possible. Brake control modules 8 of FIG. 8 can also be used in the brake system of other figures by replacing the brake control modules used in these figures.

Figure 9:
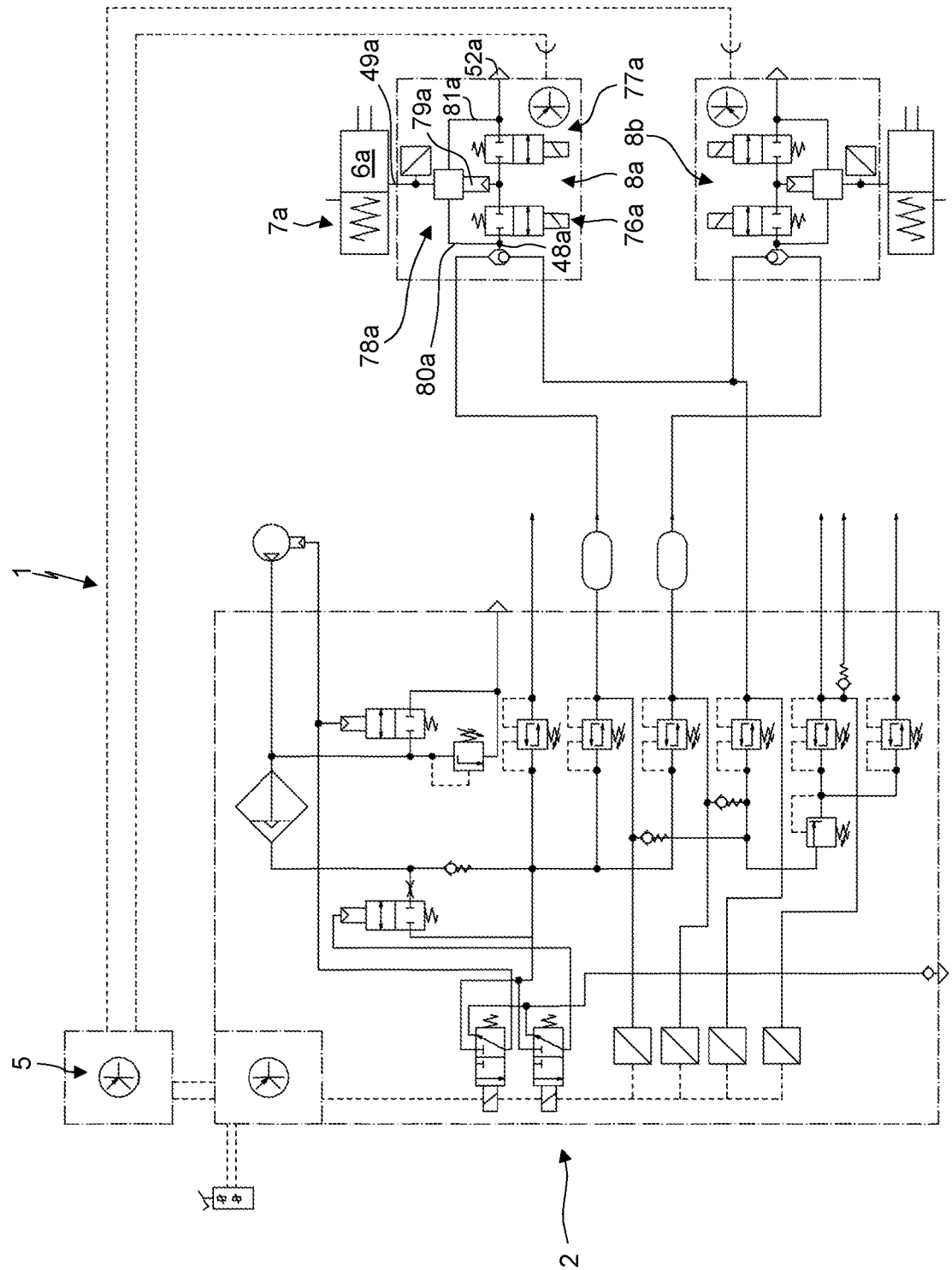

The brake system 1 of FIG. 9 corresponds to the brake system 1 of FIG. 6 except the design of the brake control module 8. Differing from the aforementioned embodiments in the brake control modules 8 no solenoid valves 50, 53 respectively 74, 75 directly controlling the brake pressure are used. Instead, here the solenoid valves 76, 77 serve for a pilot-control of a relay valve 78. For the embodiment shown here the solenoid valve 76, 77 are each embodied as 2/2-solenoid valves which preferably take their closed positions without energization. Here, the solenoid valve 76 is interposed between the inlet line 48 and a control port 79 of the relay valve 78 whereas the solenoid valve 77 is interposed between the control port 79 and the vent 52. The inlet line 48 is connected via a line branch 80 to a supply port of the relay valve 78. In a corresponding way a venting port of the relay valve 78 is connected via a line branch 81 to the vent 52. Accordingly, the relay valve 78 generates a brake pressure at the outlet port 49 corresponding to the pilot-control by the solenoid valves 76, 77.

Differing from the embodiment shown in FIG. 9 it is alternatively also possible that the relay valve 78 is pilot-controlled by solenoid valves arranged in a series connection. The solenoid valves might here be embodied as a 3/2-way-solenoid valve and a 2/2-way-solonoid valve (in any order). It is possible that a brake control module 8 of this type is also used in a brake system 1 of one of the other figures.

Figure 10:
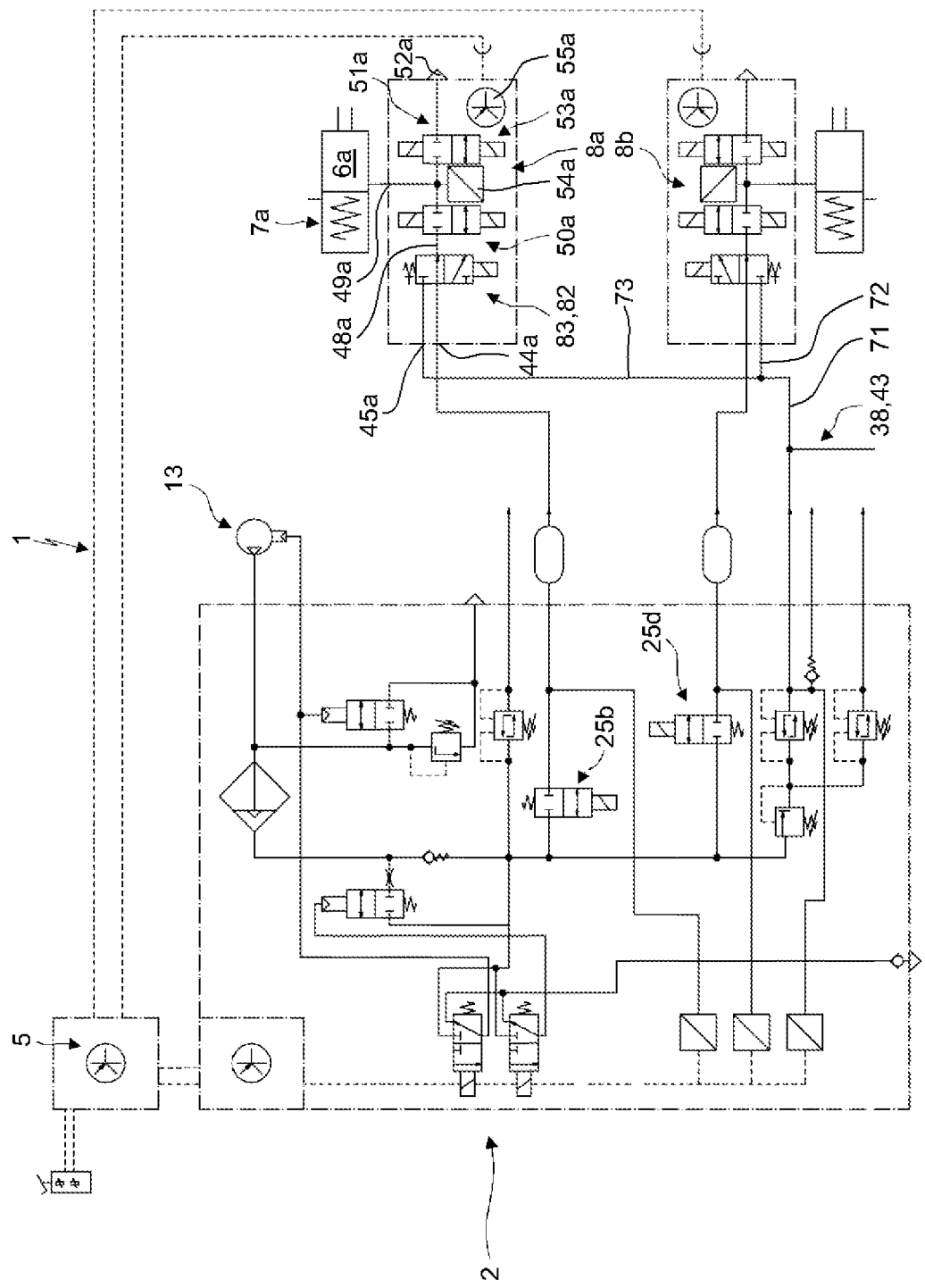

The brake system 1 of FIG. 10 corresponds to the brake system 1 of FIG. 7 except the differences explained in the following:

In FIG. 10 the circuit protection valves 25b, 25d are not pilot-controlled by solenoid valves 11c, 11d. Instead, the circuit protection valves 25b, 25d are embodied as directly electrically controlled solenoid valves.

Furthermore, here the air suspension circuit 34 does not serve as backup compressed air reservoir 43. Instead, here the trailer brake circuit 38 is used as the backup compressed air reservoir 43 so that for the backup supply compressed air is supplied from the trailer brake circuit 38 to the supply line 71 and the supply line branches 72, 73.

As another optional difference in FIG. 10 the brake control modules 8 have a design differing from the brake control modules 8 of FIG. 7 in that here the check valves 46, 47 and the switching valves 70 are not provided. Instead, the inlet line 48 is connected via a switching valve 82 to the inlet ports 44, 45. The switching valve 82 is preferably embodied as a directly electrically controlled solenoid valve which is in particular embodied as 3/2-way valve (or a pilot-controlled 3/2-way valve which is pilot-controlled by a 3/2-way-solenoid valve). The 3/2-way valve shown here in a first operating position connects the inlet port 44 to the inlet line 48 whereas the inlet port 45 is closed. Instead, in the second operating position the switching valve 82 connects the inlet port 45 to the inlet line 48 whereas the inlet port 44 is closed. Preferably, the switching valve 82 takes the first operating position without an electric energization.

In the shown embodiments a securing valve 83 (which provides a securing of the pressure in the brake control module 8 and of the brake pressure in the service brake cylinder 6 in a backup situation, so for a leakage in one of the service brake circuits 35, 37) is embodied as a check valve 46, 47, shuttle valve 70, switching valve 70 and/or switching valve 82.

For the inventive designs the brake control modules 8 are each connected to two outlets 24 of the compressed air processing unit 2. The connection is preferably provided by two parallel supply lines between the outlets 24 of the compressed air processing unit 2 and the associated brake control module 8 which are merged at a location within the brake control module 8 or outside from the same.

I claim:

1. Electropneumatic brake system for a commercial vehicle comprising:
   a) a first brake control module which is configured for controlling a first brake pressure for a first service brake cylinder of a first vehicle wheel or for first service brake cylinders of at least one first vehicle axle,
   b) a second brake control module which is configured for controlling a second brake pressure for a second service brake cylinder of a second vehicle wheel or for second service brake cylinders of at least one second vehicle axle,
   c) the first brake control module being connected both to a first compressed air reservoir as well as to a backup compressed air reservoir for a supply of compressed air and
   d) the second brake control module also being connected to the backup compressed air reservoir,
   e) wherein the first brake control module and the second brake control module each comprise a first inlet port and a second inlet port,
   f) the first inlet port and the second inlet port being connected to a common inlet line of the first brake control module respectively the second brake control module,
   g) one first inlet port being connected to the first compressed air reservoir and the other first inlet port being connected to a second compressed air reservoir and
   h) the second inlet ports being connected to the backup compressed air reservoir.

2. Brake system of claim 1, wherein compressed air is supplied from the first compressed air reservoir via a securing valve.

3. Brake system of claim 1, wherein the brake system comprises a compressed air processing unit which:
   a) comprises a pressure controller, an air dryer and at least one circuit protection valve and
   b) supplies compressed air to the first compressed air reservoir and/or to the backup compressed air reservoir.

4. Brake system of claim 3, wherein in the first brake control module and the second brake control module
   a) an inlet line is connected via a first solenoid valve to an outlet port which is connected to at least one service brake cylinder and
   b) a vent or a venting port is connected via the first solenoid valve or via a second solenoid valve to the outlet port.

5. Brake system of claim 1, wherein in the first brake control module and/or the second brake control module:
   a) an inlet line is connected via a first solenoid valve to an outlet port which is connected to at least one service brake cylinder and
   b) a vent or a venting port is connected via the first solenoid valve or via a second solenoid valve to the outlet port.

6. Brake system of claim 1, wherein in the first brake control module and/or the second brake control module an inlet line is connected via a combination of a 3/2-way-solenoid valve and a 2/2-way-solenoid valve to an outlet port for the first service brake cylinder or second service brake cylinder.

7. Brake system of claim 1, wherein in the first brake control module and/or the second brake control module an inlet line is connected via a relay valve to an outlet port for the first or second service brake cylinder, a control port of the relay valve being pressurized and vented via
   a) a combination of a 3/2-way-solenoid valve and a 2/2-way-solenoid valve or
   b) two 2/2-way-solenoid valves.

8. Brake system of claim 1, wherein the backup compressed air reservoir is the reservoir
   a) of an air suspension circuit or
   b) of a trailer brake circuit or
   c) of a parking brake circuit or
   d) of an auxiliary consumer circuit.

9. Electropneumatic brake system for a commercial vehicle comprising:
- a) a first brake control module which is configured for controlling a first brake pressure for a first service brake cylinder of a first vehicle wheel or for first service brake cylinders of at least one first vehicle axle,
- b) a second brake control module which is configured for controlling a second brake pressure for a second service brake cylinder of a second vehicle wheel or for second service brake cylinders of at least one second vehicle axle,
- c) the first brake control module being connected both to a first compressed air reservoir as well as to a backup compressed air reservoir for a supply of compressed air and
- d) the second brake control module also being connected to the backup compressed air reservoir, Brake system of claim 1, wherein
- e) a second compressed air reservoir connected to the second brake control module is the backup compressed air reservoir for the first brake control module and
- f) the first compressed air reservoir connected to the first brake control module is the backup compressed air reservoir for the second brake control module.

* * * * *